June 16, 1953 A. L. HALL ET AL 2,642,501

TELEPHONE LOCK

Filed March 24, 1950

H. B. Dyer & A. L. Hall

INVENTORS

BY Arthur Minnick

Attorney

Patented June 16, 1953 2,642,501

UNITED STATES PATENT OFFICE 2,642,501

TELEPHONE LOCK

Arthur L. Hall and Harry B. Dyer, Tampa, Fla.; said Dyer assignor to said Hall

Application March 24, 1950, Serial No. 151,614

2 Claims. (Cl. 179—189)

This invention has for its primary object to provide means by which unauthorized use of a telephone for outgoing calls may be prevented while permitting incoming calls to be received and answered.

Another object of the invention is to provide a switch by which the ringing of the telephone bells may be temporarily prevented without interfering with the normal use of the telephone or of the party line of which it may be a member.

A telephone subscriber is often at such a distance from his telephone or so busy, that without his knowledge, some other person may place a long-distance call of which he will have no information until he receives the bill for service charges. Office employes may make frequent or long-continued private calls and thus interfere with attempted incoming business calls that may be of importance. The present invention provides a simple and efficient means for locking the telephone against outgoing calls while permitting the signal bells to ring in the normal way to notify hearers of the incoming calls and allowing such calls to be answered as usual without the use of a key.

Subscribers often wish not to be annoyed or disturbed by the sound of the signal bells at their residence, as at night or in case of illness, and with the present device, the holder of the key may short-circuit the bell-ringing mechanism without causing conflict with the normal operation of other instruments on the same party line, or with the use of the telephone for outgoing calls.

Figure 1:
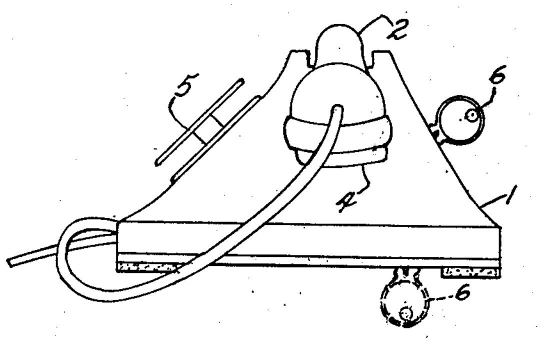
Figures 2, 3, 4, 5:
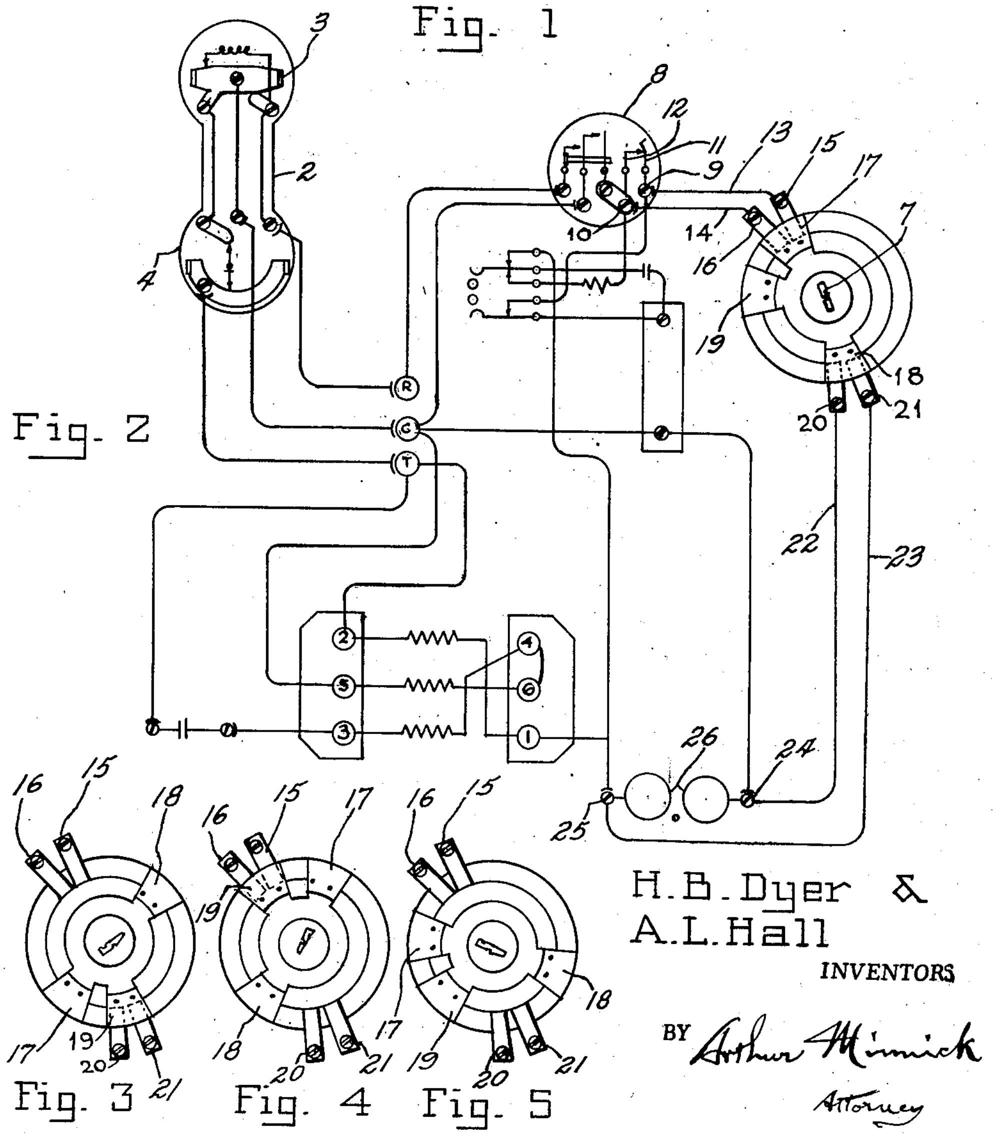

In the accompanying drawings, Figure 1 is a side elevation of a standard modern dial telephone; Fig. 2 is a partial wiring diagram of the handset, the dial, and the bells to indicate their relation to the key-operated switches; Fig. 3 is a plan view of a switch in position to control the bell circuit; Fig. 4 is a similar view with the switch in position to control the dial circuit; and Fig. 5 is a similar view with the switches all in inoperative positions.

The telephone instrument shown in a side elevation in Fig. 1, is a modification of the usual present commercial type of desk sets, in which a casing 1 forms a support for a handset having a suitable handle 2 connecting a receiver 3 and a transmitter 4. On one face of the casing is pivotally mounted the dial 5 used in the automatic exchange system for putting through an outgoing call. On the opposite face of the casing, a key 6 can be inserted to operate a locking switch mechanism 7 having any suitable means (not shown) for retaining the switch elements in any of several selected positions, in each of which the key can be withdrawn and reinserted.

The dial wiring diagram is indicated at 8 in Fig. 2, with terminals 9 and 10 for the pulsating springs 11 and 12, and from these terminals, wires 13 and 14 lead to switch terminals 15 and 16. When a rotatable switch element or connector 17 is brought into operative position to bridge across the terminals 15 and 16, as in Fig. 2, the ringing circuit of the dial is shorted through the switch circuit and the pulsating springs will not cause the operation of the switches at the central switchboard. Thus outgoing calls cannot be made by manipulation of the dial while this switch element is in operative position.

In Fig. 2, another element or connector 18 of the switch lies in operative position across terminals 20 and 21 which are connected by wires 22 and 23 of a switch circuit, with the terminals 24 and 25 of the bell-ringing system 26. Since the resistance of this bell circuit is much greater than that of the wires 22 and 23, the current passing through the bell mechanism will be insufficient to cause the bells to ring.

Thus in Fig. 2, with both switch elements 17 and 18 in operative positions, the telephone will be locked to prevent placing of outgoing calls and also to prevent ringing of the bells. In Fig. 3, the bells are put out of service by the member 19, but the dial circuit is not shorted and outgoing calls can be placed in the usual way. In Fig. 4, the dial circuit is locked against placing outgoing calls, with the member 19 in operative position, but the bells will ring for an incoming call.

In Fig. 5, all three switch elements are in their inoperative positions and the telephone is set for normal operation. As shown, the rotatable switch mechanism 7 has the elements 17, 18, and 19 secured thereto for movement in unison in definite spaced relations and having in common a single operating key to move them into any selected position.

The casing on a desk set is usually provided with a botom plate held in place by one or two screws which are removable with an ordinary screwdriver. When the present locking device is to be used to protect the set from unauthorized operation, it will be desirable to use a closure plate to cover the bottom of the casing in such manner as to prevent taking out of the screws and to use a lock for this plate, preferably operated by the same key 6 used for the switch. The key handle indicated in broken lines in Fig. 1 beneath the casing represents the location of such a lock for the bottom plate.

We claim:

1. In a telephone subscriber's station apparatus of the type having a handset incorporating a transmitter and receiver, a dial having pulsating contacts, a ringer and a handset-operated switch for selectively connecting said ringer across said line in one position of said switch and for connecting said pulsating contacts across said line in another position of said switch, the improvement which comprises a switch having two pairs of fixed contacts and a movable contact-shunting element having portions arranged to shunt selectively either, neither and both of said pairs of fixed contacts, one pair of said fixed contacts being connected across said pulsing contacts and the other pair of said fixed contacts being connected across said ringer, and means for moving said contact-shunting element to any of its selective positions.

2. The combination of claim 1, including means for locking said contact-shunting element in any of its selective positions.

ARTHUR L. HALL.
HARRY B. DYER.

References Cited in the file of this patent

UNITED STATES PATENTS

| Number | Name | Date |
|---|---|---|
| 1,132,700 | Blake et al. | Mar. 23, 1915 |
| 1,194,959 | Cotton | Aug. 15, 1916 |
| 1,267,516 | Cox | May 28, 1918 |
| 1,421,493 | Kellogg | July 4, 1922 |
| 1,739,889 | Conti | Dec. 17, 1929 |
| 1,762,746 | Shann | June 10, 1930 |
| 1,812,984 | Richey | July 7, 1931 |
| 1,899,445 | Miller | Feb. 8, 1933 |
| 2,372,262 | Edwards et al. | Mar. 27, 1945 |
| 2,394,275 | Tschumi | Feb. 5, 1946 |

FOREIGN PATENTS

| Number | Country | Date |
|---|---|---|
| 40,893 | Norway | Feb. 9, 1925 |